(12) United States Patent
Reuter et al.

(10) Patent No.: US 9,915,434 B2
(45) Date of Patent: Mar. 13, 2018

(54) AIR TEMPERATURE REGULATING ASSEMBLY USING THERMAL STORAGE

(71) Applicants: Regine Kröger, Stellenbosch (ZA); Stellenbosch University, Stellenbosch, Western Cape Province (ZA)

(72) Inventors: Hanno Carl Rudolf Reuter, Stellenbosch (ZA); Johann Pierre Terblanche, Stellenbosch (ZA); Detlev Gustav Kröger, Stellenbosch (ZA)

(73) Assignee: STELLENBOSCH UNIVERSITY, Stellenbosch, Western Cape Province (ZA)

( * ) Notice: Subject to any disclaimer, the term of this patent is extended or adjusted under 35 U.S.C. 154(b) by 414 days.

(21) Appl. No.: 14/797,662

(22) Filed: Jul. 13, 2015

(65) Prior Publication Data

US 2016/0010876 A1 Jan. 14, 2016

(30) Foreign Application Priority Data

Jul. 14, 2014 (ZA) .................................. 2014/05114

(51) Int. Cl.
*F24D 11/00* (2006.01)
*F24D 19/10* (2006.01)

(52) U.S. Cl.
CPC .......... *F24D 11/007* (2013.01); *F24D 19/109* (2013.01); *F24D 2200/14* (2013.01); *F24D 2220/0271* (2013.01); *Y02B 10/20* (2013.01); *Y02B 10/70* (2013.01)

(58) Field of Classification Search
CPC .. F24D 11/007; F24D 19/109; F24D 2200/14; F24D 2220/0271; Y02B 10/20; Y02B 10/70
See application file for complete search history.

(56) References Cited

U.S. PATENT DOCUMENTS 4,324,289 A * 4/1982 Lahti ..................... F24D 11/007
126/620

* cited by examiner

*Primary Examiner* — Alfred Basichas
(74) *Attorney, Agent, or Firm* — Brian C. Trinque; Gordon R. Moriarty; Lathrop Gage LLP

(57) ABSTRACT

An air temperature regulating assembly is provided having a packed rock bed through which air may flow between outer and inner spaces by way of interstices between rock units in order to transfer heat to or from the rock bed, in use. Dampers control the flow of air between the outer space, the inner space, an enclosed air space the temperature of which is to be regulated by raising or lowering it and the surrounding atmosphere. A fan moves air within the assembly. The rock bed is in the form of a pile of rocks having an upper surface that is inclined and directed in the general direction of the sun to directly absorb solar energy. The outer space is defined between the upper inclined surface of the rock bed and a transparent cover spaced upwardly from the surface of the rock bed.

11 Claims, 3 Drawing Sheets

AIR TEMPERATURE REGULATING ASSEMBLY USING THERMAL STORAGE

CROSS-REFERENCE(S) TO RELATED APPLICATIONS

This application claims priority to South African provisional patent application number 2014/05114, filed Jul. 14, 2014, which is incorporated by reference herein.

FIELD OF THE INVENTION

This invention relates to an air temperature regulating assembly using thermal storage and that generally has at least two different modes of operation. The invention in particular relates to an air temperature regulating assembly in which the temperature of air in an enclosed air space is raised or lowered in an effort to cause the temperature to approach, or be maintained in, a target temperature range.

Still more particularly, the invention relates to an air temperature regulating assembly that utilizes, at least in one mode of operation, solar energy as a source of heating.

The enclosed air space may be any air space such as the interior of a factory, a warehouse, a shopping mall, offices, residential housing and hotels as well as an enclosed agricultural production facility such as a chicken broiler and other animal husbandry facility as well as a vegetable production enclosure, whenever sufficient and suitable ground space is available.

A damper for the purposes of this specification may be considered to be a valve, plate or series of vanes that stops or regulates the flow of air inside a duct or through an opening or other air handling equipment. Manual dampers may be operated by a handle on the outside of a duct. Automatic dampers may be used to regulate airflow constantly or intermittently and may be operated by a solenoid, an electric, hydraulic or pneumatic motor controlled by a thermostat or controller in a building automation system.

BACKGROUND TO THE INVENTION

Packed beds of rock for thermal storage have been used for air-conditioning applications for decades.

Solar thermal energy storage in rock beds is widely used for different applications such as thermal power plants, space heating and cooling and some agricultural purposes for the drying of foods.

Space heating and cooling has been achieved by making use of solar air heaters consisting mostly of an absorber plate, transparent cover and a heat transfer fluid. Air is heated up in the solar heater and the heat may be stored in any thermal storage facility such as a rock bed. As the need arises to use this stored thermal energy, the airstream may be reversed through the rock bed and heat extracted from it.

Evaporative cooling in air spaces has also been used for a long time and has been achieved by forcing air through wetted pads or porous media or by directly spraying water into airstreams.

The problem with existing space-heaters and coolers combined with rock bed storage is that it makes use of an absorber plate heater to heat up the heat transfer fluid (air) to store the energy. Separate evaporative cooling is needed to achieve heating and cooling.

SUMMARY OF THE INVENTION

In accordance with this invention there is provided an air temperature regulating assembly comprising an outer space and an inner space separated by a packed rock bed of individual rock units such that air may flow between the outer and inner spaces by way of interstices between individual rock units in order to provide for the transfer of heat to or from the rock bed, in use; a first damper and a first duct or opening communicating between the outer space and an enclosed air space the temperature of which is to be regulated by raising or lowering it; a second damper and second duct or opening communicating between the inner space and the enclosed air space; a third damper and a third duct or opening communicating directly between the inner space and outer space; a fourth damper and fourth duct or opening communicating between the outer space and the surrounding atmosphere; and a fan for moving air within the inner space; the assembly being characterized in that the rock bed is in the form of a pile of rocks having an upper surface that is inclined and directed in the general direction of the sun so that it can directly absorb solar energy and wherein the outer space is defined between the upper inclined surface of the rock bed and a transparent cover spaced upwardly from the surface of the rock bed and forming an upper boundary of the outer space.

Further features of the invention provide for the rock bed to be formed against an upright structure so as to have substantially only the upper inclined surface directed generally upwards and outwards in the general direction of the sun; for the inner space to be formed between a lower extremity of the rock bed that is supported by a suitable grid or mesh optionally with larger rocks to support smaller rocks of the packed bed and maintain the inner space which is preferably located in a corner between a floor and an upright wall supporting the rock bed on its side opposite the inclined upper surface; for the rock bed to extend along a substantial portion of a wall that may conveniently form part of a wall of the enclosed air space; for a supporting floor and also, according to circumstances any supporting wall, to be thermally insulated; for a retractable heat retaining layer to be provided for the transparent cover to selectively cover it from time to time; for a series of sprinklers to be provided for applying water to the top surface of the rock bed as may be required for purposes of evaporative cooling; and optionally for the fan to be a variable speed fan.

The air temperature regulating assembly has a positive charging mode of operation in which the first, second and fourth dampers are closed and the third is open so that air can be drawn through the rock bed from the outer space to the inner space to become warmed by heated rocks near the inclined surface and transfer the heat deeper into the rock bed as the air moves towards the inner space. In the event of an exclusively charging condition the air is simply recirculated directly back to the outer space from whence it can pass through the rock bed in a continuous manner.

It is, however, also possible to have a combination mode in which the first and second dampers are partially, or even fully open, in which instance the heat being generated in the rock bed is used partially or fully, by circulating at least some and possibly all of the air through the enclosed air space and thereby utilizing at least some or all of the heat received from the sun immediately.

In a discharging mode heat that has been accumulated in the rock bed can be recovered by circulating air through the rock bed and thence to the enclosed air space. The discharging mode is achieved by opening the first and second dampers; closing the third damper; and maintaining the fourth damper closed. At the same time, if a retractable heat retaining layer is provided for the transparent cover, this can be closed in order to conserve heat.

The air temperature regulating assembly also has a negative charging mode in which the rock bed is cooled using cool night air or evaporative cooling using sprays from the series of water sprinklers, or both. In this negative charging mode the fourth damper may be open and cool night air passed through the rock bed in order that the rock bed becomes cooled. An additional damper at the upper end of the outer space may be closed so that air can be discharged once it has reached the inner space without mixing with fresh cool air in the outer space. Alternatively, it can be circulated to the enclosed air space should that be appropriate.

Cooling can be enhanced by spraying water onto the rock bed by way of the series of sprinklers to take advantage of evaporative cooling.

In a negative discharging mode air from the enclosed air space can be circulated through the rock bed to become cooled by contact with the cooled rocks. In this mode the first and second dampers are open. Of course, various combination modes are also possible in the negative charging and discharging modes.

The various possible modes of operation and combinations thereof are preferably controlled by means of a controller that operates the various dampers and the speed of operation of the fan in the event that it is a variable speed fan, according to inputs from temperature sensors that sense the temperatures in the enclosed air space, the ambient temperature, and the temperature of the air in or leaving the inner space. The inputs preferably include the pressure drop across the rock bed and the pressure drop between the inner space and the enclosed air space.

The invention therefore also provides an air temperature regulating assembly as defined above in combination with a controller for controlling the operation of the various dampers; any retractable heat retaining layer for covering the transparent cover; and the speed of the fan in the event that a variable speed fan is used.

The rock bed may consist of rocks selected from rock types such as (although not limited to) granite, dolerite, gneiss and hornfels with the rocks preferably being generally similar in size and, preferably within the range of from 10 to 60 mm in size.

The rocks may be either rounded or crushed and the inclined surface preferably slopes downwards at a natural angle of repose that is typically within the range of 20 to 50° and usually within the range of 30 to 40°.

The rock pile may have any suitable height that is typically between 1 and 15 metres.

The size of the facility will depend primarily upon the desired capacity. The capacity may be determined in consideration of the requirements for heating the air in the enclosed air space, for example in winter; the average solar thermal energy available; and the typical winter and summer conditions to be accommodated.

The facility could cover an area as small as a few square metres, or several thousand square metres or more. When the size is such that further scaling-up increases the cost non-linearly due to the requirements of the containment structure, a number of smaller rock beds may be constructed instead of a single large rock bed.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

In order that the above and other features of the invention may be more fully understood one embodiment of the invention will now be described with reference to the accompanying drawings.

DETAILED DESCRIPTION WITH REFERENCE TO THE DRAWINGS

Figure 1:
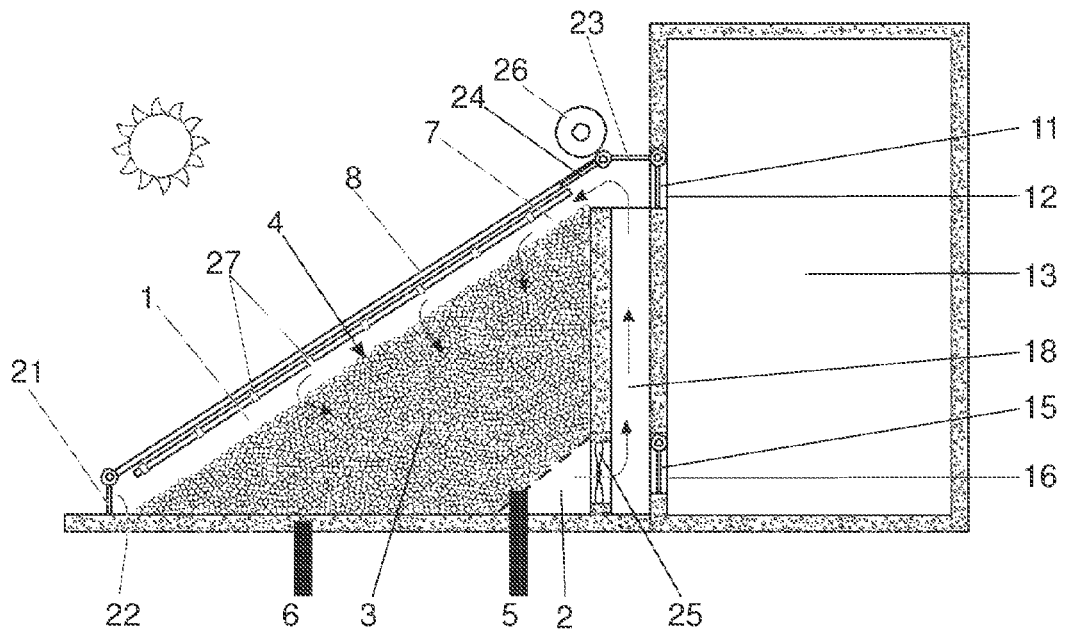
FIG. 1 is a schematic sectional elevation of one embodiment of the invention illustrating a positive charging mode of the assembly.

In the embodiment of the invention illustrated in FIGS. 1 to 4, an air temperature regulating assembly comprises an outer space (1) and an inner space (2) separated by a packed rock bed (3) of individual rock units such that air may flow between the outer and inner spaces by way of interstices between individual rock units in order to provide for the transfer of heat to or from the rock bed, in use. The rock bed is in the form of a pile of generally unconstrained rocks having an upper surface (4) that is inclined and directed generally towards the sun so that it can directly absorb solar energy.

Accordingly, in the southern hemisphere the inclined surface would be facing approximately north and in the northern hemisphere it would be facing approximately south.

The inner space is formed between a lower extremity of the rock bed that is supported by a suitable grid or mesh (5) optionally with larger rocks to support smaller rocks of the packed bed and maintain the inner space which is preferably located in a corner between a heat insulated floor (6) and an upright wall (7) supporting the rock bed on its side opposite the inclined upper surface. The upright wall that may be heat insulated, could be a wall of the enclose air space, for example.

The outer space is defined between the upper inclined surface of the rock bed and a transparent cover (8) that serves also as a roof is spaced upwardly from the inclined surface of the rock bed. The transparent cover extends generally parallel to the inclined surface of the rock bed and forms an upper boundary of the outer space. The inclined surface of the rock bed preferably slopes downwards at a natural angle of repose of the particular rocks concerned.

A first damper (11) and a first duct or opening (12) communicate between the outer space (1) and an enclosed air space (13) the temperature of which is to be regulated by raising or lowering it.

Figure 3:
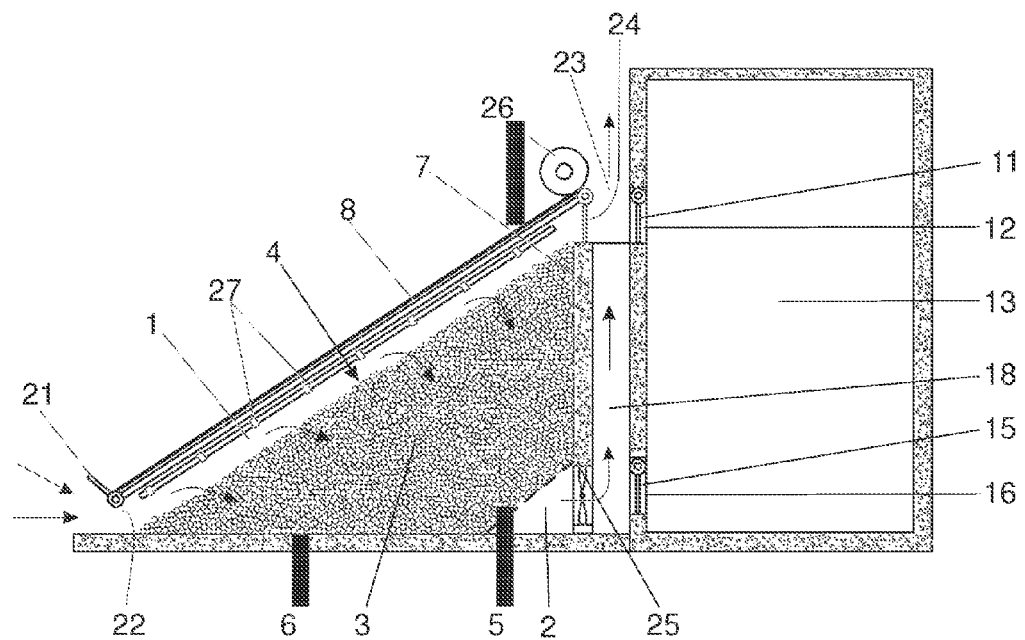
FIG. 3 is the same as FIG. 1 but illustrating a negative charging mode of the assembly.
Figure 4:
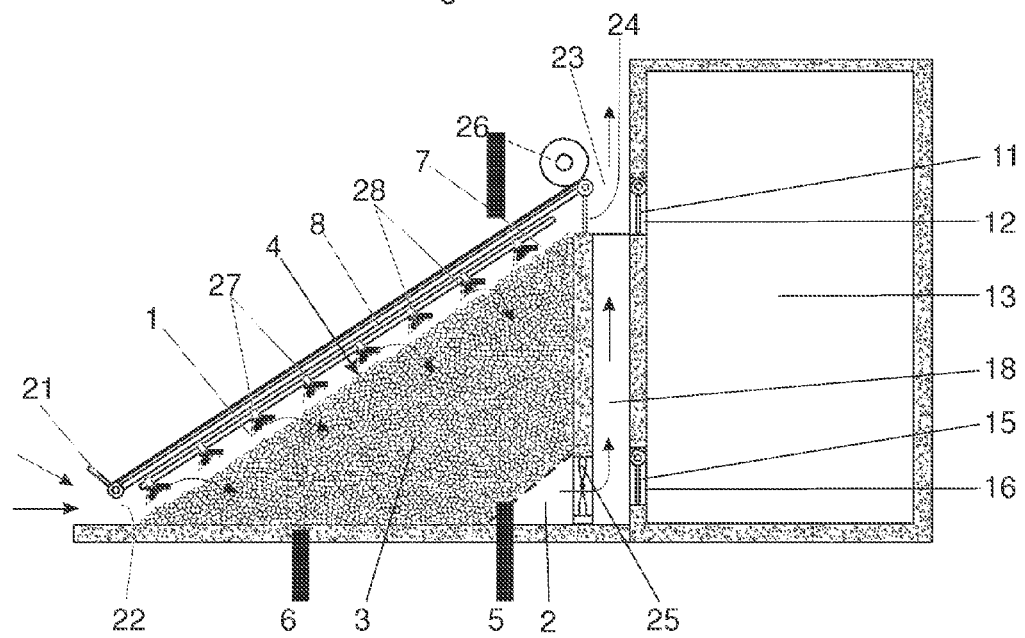
FIG. 4 is the same as FIG. 3 but illustrating a negative charging mode of the assembly aided by water sprays from a sprinkler system to provide for evaporative cooling; and, FIG. 5 is a schematic diagram showing an automatic control arrangement of an assembly as illustrated in FIGS. 1 to 4.

A second damper (15) and second duct or opening (16) communicates between the inner space (2) and the enclosed air space (13) (see FIGS. 1, 3 and 4).

A third damper (17) (see FIG. 2) and a third duct or opening (18) communicates directly between the inner space and outer space as shown clearly in FIG. 1. It should be noted that the second and third dampers could be constituted by a single closure flap that is movable between the two terminal positions shown in FIGS. 1, 3 and 4 in which it is shown as constituting the second damper (15) and the position shown in FIG. 2 in which it is shown as constituting the third damper (17). Positions of the flap between those two terminal positions would correspond with combination modes of operation as will be quite apparent to those of ordinary skill in the art.

A fourth damper (21) and fourth duct or opening (22) communicates between the outer space (1) and the surrounding atmosphere at the lower end of the inclined surface of the rock bed.

A fifth damper (23) (see FIGS. 1 and 2) controls an outlet to atmosphere from an upper end of the outer space.

A sixth damper (24) (see FIGS. 3 and 4) may be provided to close off the upper end of the inclined outer space in the negative charging modes of operation so as to prevent any mixing of the discharge air with the cool air entering the rock bed.

It should be noted that the function served by the fifth damper could possibly be served by the first damper in a second terminal position as will be quite apparent from a reference to FIGS. 1 and 3, for example.

A fan (25) that is conveniently a variable speed fan, is provided for moving air within the inner space either towards the enclosed air space (13) or towards the outer space (1), as may be the situation dictated by the position of the second and third dampers (or the single flap serving both purposes). It should be noted that if the fan is not of a variable speed type it is also possible to control the operation of the assembly simply by controlling the opening and closing of the various dampers.

A retractable heat retaining layer (26), that may be in the form of a tarpaulin, is provided for the transparent cover to retain heat from time to time, the heat retaining layer preferably being in the form of a roll of flexible sheet material that can be unrolled automatically from time to time.

A series of sprinklers (27) is provided for spraying water onto the top surface of the rock bed as may be required for purposes of evaporative cooling.

The air temperature regulating assembly described above has a positive charging mode of operation that is shown in FIG. 1 in which the first damper (11), second damper (15), fourth damper (21) and fifth damper (23) are closed and the third damper (17) and sixth damper (24) are open so that air can be drawn from the outer space (1) through the rock bed by the fan to the inner space (2). The retractable heat retaining layer (26) is of course retracted in this mode of operation. As air moves into the solar heated rocks near the inclined surface it becomes warmed and transfers the heat deeper into the rock bed as it moves towards the inner space. In an exclusively charging condition the air is simply recirculated directly back to the outer space by way of the duct (18) with the third damper (17) and the sixth damper (24) both open so that the air can pass through the rock bed repeatedly. In this way the rock bed becomes charged with thermal energy at an elevated temperature and the energy can be used as and when required.

It should be noted, however, that it is also possible to have a combination mode in which the first (11) and second (15) dampers are partially, or even fully open in which instance the solar energy present in the rock bed is used partially or fully, by circulating at least some of the heated air through the enclosed air space (13) and thereby utilizing at least some of the solar energy received from the sun immediately.

If a single flap is used to serve the purposes of both the second damper (15) and the third damper (17) then positions of the flap in between the two terminal positions may be employed for such combination modes.

Figure 2:
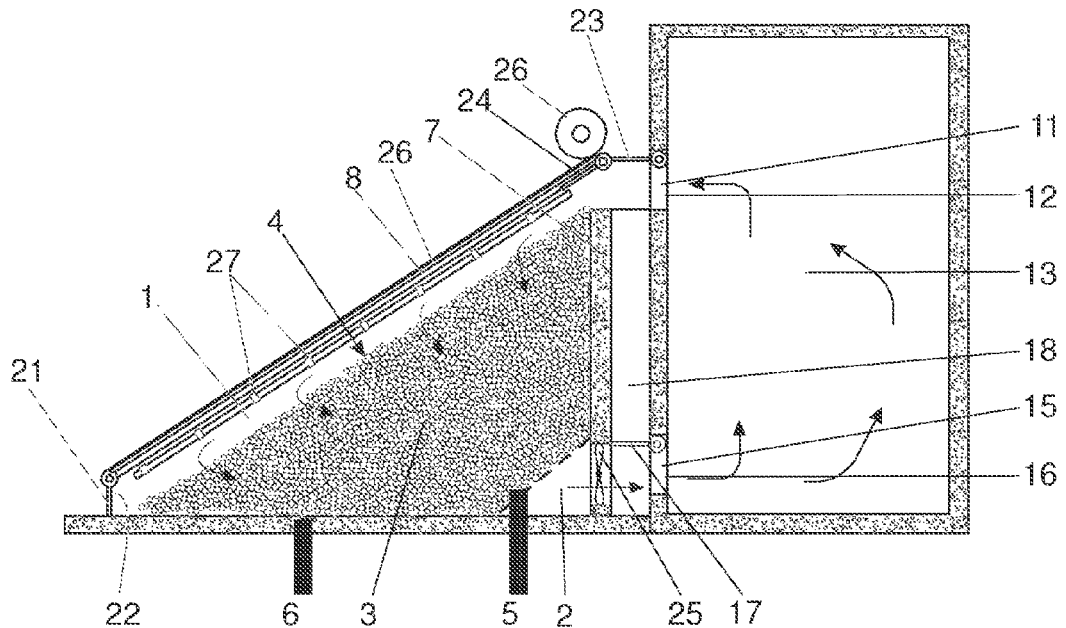
FIG. 2 is the same as FIG. 1 but illustrating a positive discharging mode of the assembly.

In a positive forward discharging mode the heat that has been accumulated in the rock bed can be recovered, as shown in FIG. 2, by circulating air from the outer space (1) through the rock bed (3) to the inner space (2) and thence to the enclosed air space. The positive discharging mode is achieved by opening the first damper (11) and the second damper (15); closing the third damper (17); maintaining the sixth damper (24) open; and maintaining the fourth damper (21) and fifth damper (23) closed. At the same time, if a retractable heat retaining layer is provided for the transparent cover, this can be closed in order to conserve heat and limit heat losses by way of the transparent cover (8).

The air temperature regulating assembly also has a negative charging mode that is shown in FIG. 3 in which the rock bed is cooled using cool night air. In this negative charging mode the fourth damper (21) may be open and cool night air may be drawn through the rock bed in order that the rock bed becomes cooled. The sixth damper (24) is closed in order to prevent discharge air mixing with cool night air in the outer space. In this instance the air can be discharged once it has reached the inner space (2) or it can be circulated to the enclosed air space (13) as may be appropriate.

Cooling can, as shown in FIG. 4, be enhanced by spraying water on the rock bed, as indicated by numeral (28), by way of the series of sprinklers (27) to take advantage of evaporative cooling.

In a negative discharging mode air from the enclosed air space can be circulated through the rock bed to become cooled by contact with the cooled rocks. Of course, various combination modes are also possible in the negative charging and discharging modes.

Figure 5:
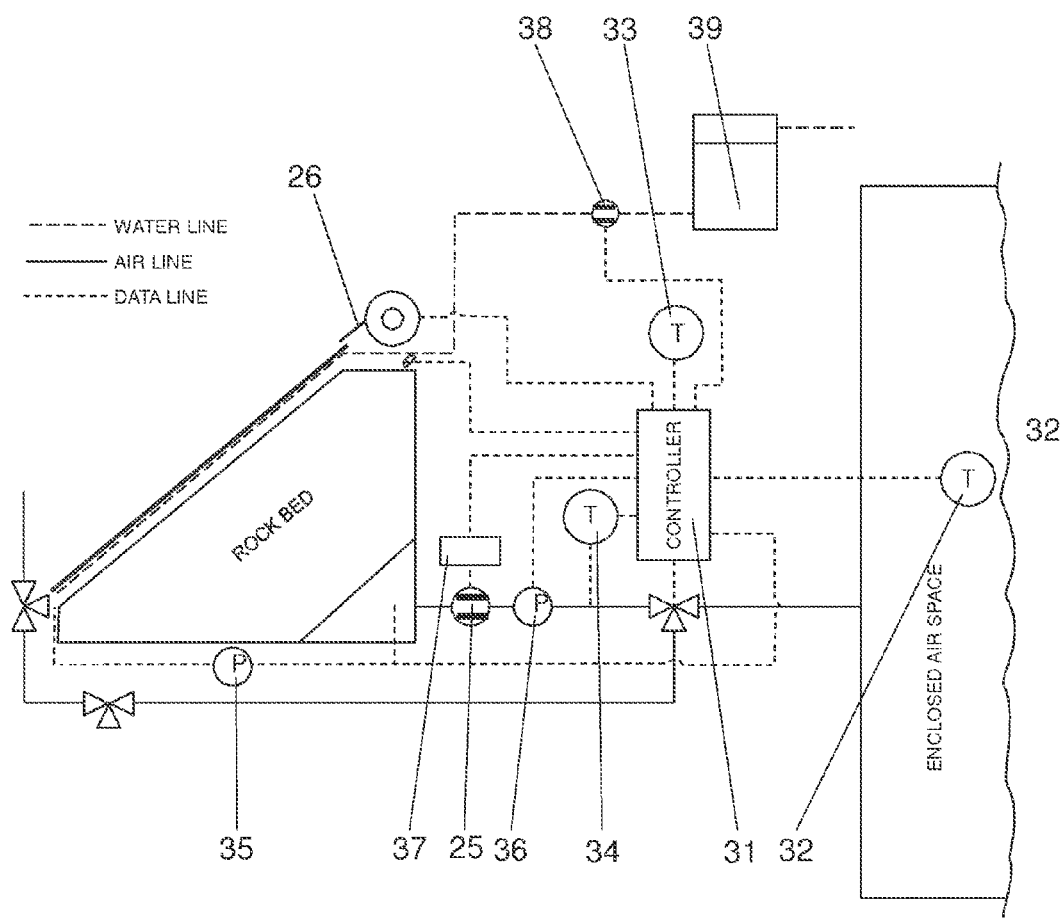

As indicated above, and with particular reference to FIG. 5, the various possible modes of operation and combinations thereof are preferably controlled by means of a controller (31) that automatically operates the various dampers and the speed of operation of the variable speed fan according to inputs from temperature sensors and pressure sensors. These sensors include a temperature sensor (32) that senses the temperature in the enclosed air space; a temperature sensor (33) that senses the ambient temperature, and a temperature sensor (34) that senses the temperature of the air in or leaving the inner space.

The inputs to the controller also include data reflecting the pressure drop (35) across the rock bed and data reflecting the pressure drop (36) between the inner space and the enclosed air space whereof the temperature is being regulated.

The controller may be programmed to control the entire assembly according to the inputs received and one or other algorithms or schedules that reflect the possible settings of the assembly. In particular, it can control the variable speed fan by way of a variable speed drive (37); the extension and retraction of the retractable heat retaining layer (26); and a water pump (38) for supplying water from a supply tank (39) to the sprinklers.

When the assembly operates as a heater, solar heat may be harnessed and stored in the rock-bed during the day and this heat may be extracted from the rock bed mainly during the night.

The transparent roof is uncovered during the day so that the sun can shine on the rock-bed, heating the rocks on the surface. During discharge the retractable heat retaining layer (26) is closed and located over the transparent cover. The amount of heat that is extracted from the rock-bed is controlled by regulating the fan speed.

When the system is operated as a dry-cooler e.g. during summer months, cold air is used to cool the rock-bed during the night and this cold storage is then extracted from the rock-bed mainly during the day. During charging of the rock bed air passes between the transparent cover and the rocks before entering the rocks. As the cold air enters the rock bed it cools the rocks inside the bed along its path, thereby cold charging the rock bed. The amount of cold storage that is extracted from the rock bed is controlled by regulating the fan speed.

A wet-cooling mode is similar to dry-cooling except that water is sprayed onto the rock bed to enhance the cooling by virtue of evaporative cooling. The main benefit of the wet-cooling compared to standard evaporative cooling, is that if wet-cooling is used during charging, the cold air that is obtained during a discharge phase is dry and not humid as is the case with conventional systems.

It will be understood that numerous variations may be made to the embodiment of the invention described above without departing from the scope hereof.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. An air temperature regulating assembly comprising an outer space and an inner space separated by a packed rock bed of individual rock units such that air may flow between the outer and inner spaces by way of interstices between individual rock units in order to provide for the transfer of heat to or from the rock bed, in use; a first damper and a first duct or opening communicating between the outer space and an enclosed air space the temperature of which is to be regulated by raising or lowering it; a second damper and second duct or opening communicating between the inner space and the enclosed air space; a third damper and a third duct or opening communicating directly between the inner space and outer space; a fourth damper and fourth duct or opening communicating between the outer space and the surrounding atmosphere; and a fan for moving air within the inner space; wherein the rock bed is in the form of a pile of rocks having an upper surface that is inclined and directed in the general direction of the sun so that it can directly absorb solar energy and wherein the outer space is defined between the upper inclined surface of the rock bed and a transparent cover spaced upwardly from the surface of the rock bed and forming an upper boundary of the outer space.

2. An air temperature regulating assembly as claimed in claim 1 in which the rock bed is formed against an upright structure so as to have substantially only the upper inclined surface directed upwards and outwards in the general direction of the sun.

3. An air temperature regulating assembly as claimed in claim 1 in which the inner space is formed between a lower extremity of the rock bed that is supported by a suitable grid or mesh to maintain the inner space which is located in a corner between a floor and an upright wall supporting the rock bed on its side opposite the inclined upper surface.

4. An air temperature regulating assembly as claimed in claim 1 in which a retractable heat retaining layer is provided for the transparent cover to selectively cover it from time to time.

5. An air temperature regulating assembly as claimed in claim 1 in which a series of sprinklers is provided for applying water to the top surface of the rock bed as may be required for the purpose of evaporative cooling.

6. An air temperature regulating assembly as claimed in claim 1 in which the fan is a variable speed fan.

7. An air temperature regulating assembly as claimed in claim 1 in which the assembly has a positive charging mode of operation in which the first and second dampers are closed or only partially open; the fourth damper is closed and the third damper is open so that air can be drawn through the rock bed from the outer space to the inner space to become warmed by heated rocks near the inclined surface and transfer heat deeper into the rock bed as the air moves towards the inner space and a discharging mode in which the first and second dampers are open and the third damper and fourth dampers are closed so that heat that has been accumulated in the rock bed is recovered by circulating air through the rock bed and thence to the enclosed air space.

8. An air temperature regulating assembly as claimed in claim 7 wherein the assembly has a retractable heat retaining layer to selectively cover the transparent cover from time to time wherein the retractable heat retaining layer is closed during a discharge mode of operation.

9. An air temperature regulating assembly as claimed in claim 1 in which the assembly has a negative charging mode in which the rock bed is cooled using cool night air or evaporative cooling using sprays from the series of water sprinklers, or both wherein the fourth damper is open and cool night air passed through the rock bed in order that the rock bed becomes cooled and a negative discharging mode in which the first and second dampers are open and air from the enclosed air space is circulated through the rock bed to become cooled by contact with the cooled rocks.

10. An air temperature regulating assembly as claimed in claim 1 in which a controller operates the various dampers and the operation of the fan, the controller operating according to inputs from temperature sensors that sense the temperatures in the enclosed air space, the ambient temperature, and the temperature of air in or leaving the inner space.

11. An air temperature regulating assembly as claimed in claim 10 in which the inputs to the controller include a pressure drop across the rock bed and a pressure drop between the inner space and the enclosed air space.

* * * * *